July 28, 1959   R. M. BUSH ET AL   2,896,590
FLUID MOTOR
Filed April 5, 1957   4 Sheets-Sheet 1
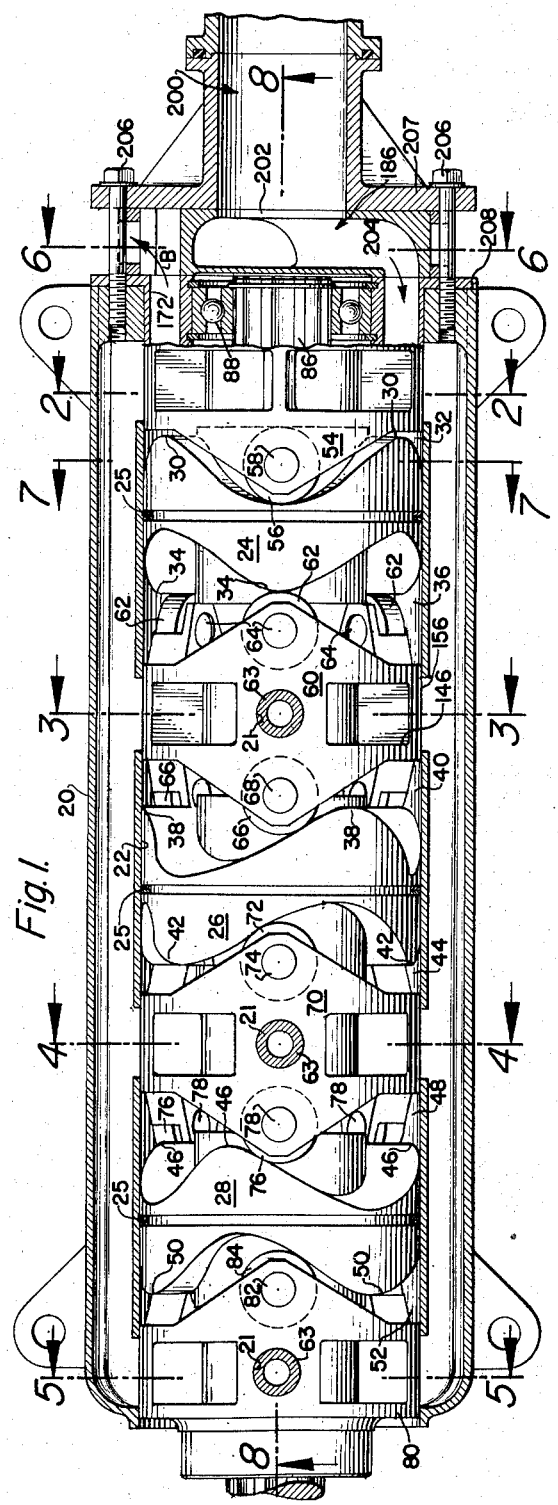
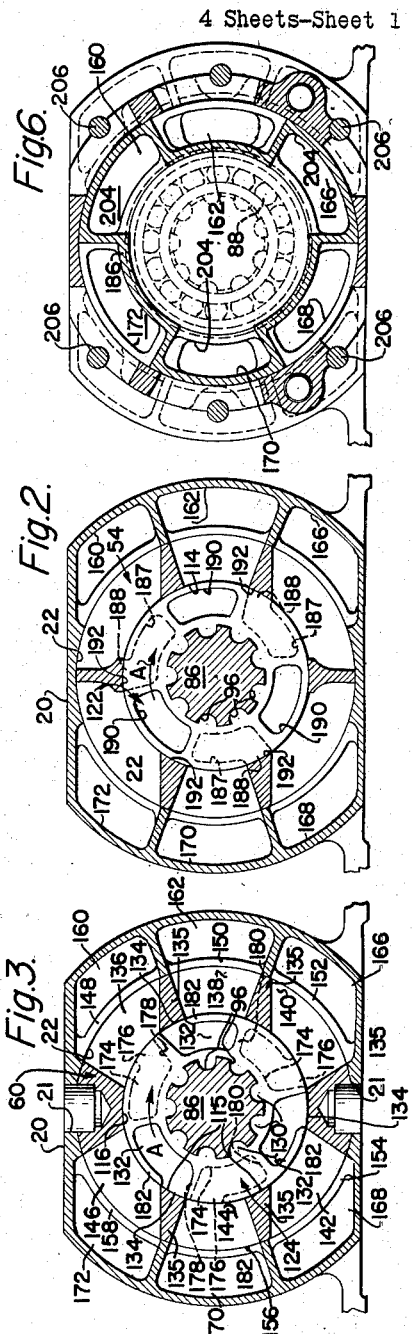
INVENTORS:
ROBERT M. BUSH,
RAYMOND W. JENSEN,
LOUIS T. KING,

INVENTORS:
ROBERT M. BUSH,
RAYMOND W. JENSEN,
LOUIS T. KING,

July 28, 1959 R. M. BUSH ET AL 2,896,590
FLUID MOTOR
Filed April 5, 1957 4 Sheets-Sheet 4
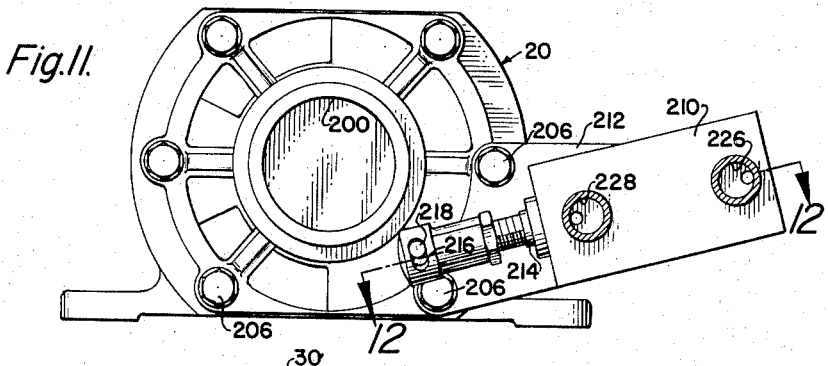
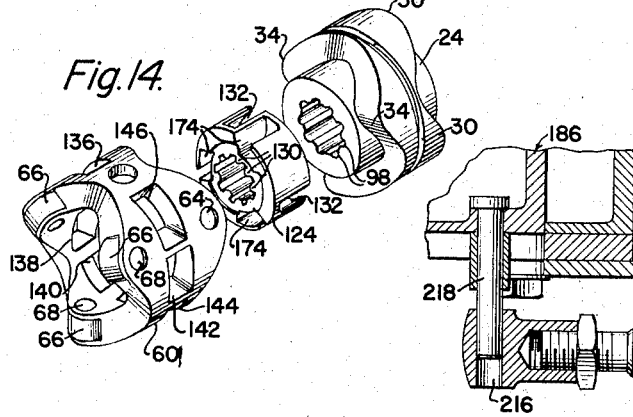
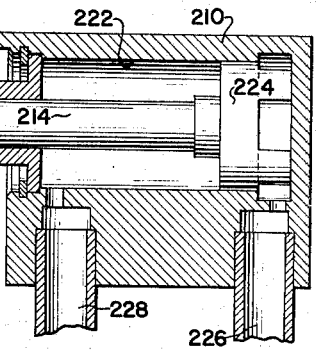
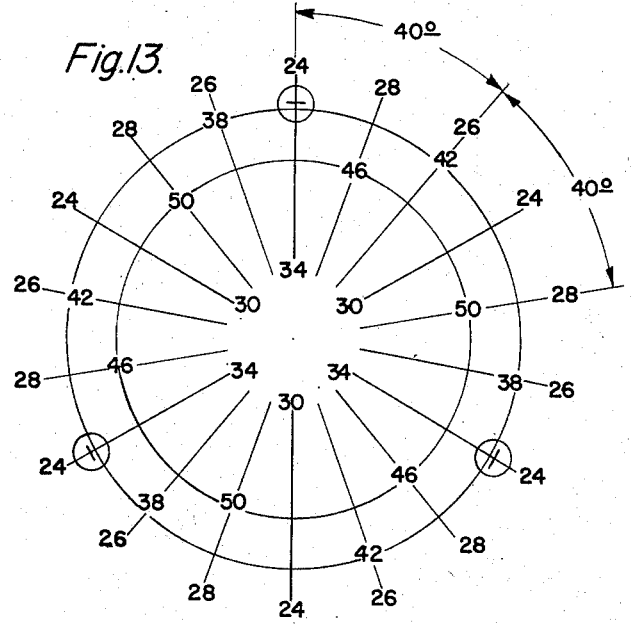
INVENTORS:
ROBERT M. BUSH,
RAYMOND W. JENSEN,
LOUIS T. KING,

United States Patent Office 2,896,590
Patented July 28, 1959

2,896,590

FLUID MOTOR

Robert M. Bush, Raymond W. Jensen, and Louis T. King, Phoenix, Ariz., assignors to The Garrett Corporation, Los Angeles, Calif., a corporation of California Application April 5, 1957, Serial No. 650,933

17 Claims. (Cl. 121—119)

This invention relates to a fluid motor, and more particularly, to a high torque, low speed, fluid motor capable of operating at high temperature conditions which destroy lubricants and prevent or limit the use thereof between operating parts of the motor.

In high speed aircraft, many of the accessories must operate under high temperature conditions. For example, the exit nozzles of jet engines operate at high temperatures and require adjacent means for actuating them. Some aircraft operate at such high speeds that the inherently high temperature ram air causes heating throughout the structure and accessories thereof.

Hydraulic equipment, under high operating temperatures, is difficult to maintain due to the fact that hydraulic fluid breaks down or vaporizes and creates a variety of undesirable conditions.

Electric motors also fail to operate at high temperatures due in part to deterioration of insulating materials therein and the inability of such motors to dissipate heat when operating under such conditions.

In high speed aircraft, wherein equipment must operate at high temperatures, pneumatically operated accessories have functional advantages due to the fact that a pneumatic motive fluid is generally stable under high temperature conditions.

Accordingly, it is an object of the present invention to provide a fluid motor which will operate various accessories in an aircraft under high temperature conditions.

Another object of the invention is to provide a compact high torque low speed pneumatic motor which will operate under high temperature conditions and without lubrication.

Another object of the invention is to provide a pneumatic motor which is particularly designed to deliver high torque at low speeds whereby the mechanism of the motor may deliver a desired amount of power and yet operate at high temperatures, without lubrication between the operating parts thereof.

Another object of the invention is to provide a fluid motor having a novel combination of axially movable cam operated pistons concentrically connected to a common shaft by spline means which permits the pistons to rotate the shaft and at the same time reciprocate axially thereon.

A further object of the invention is to provide a fluid motor having a novel combination of a rotating shaft driven by concentric cam actuated pistons movable relative to opposite sides of a partition in which rotary valve means, driven by the shaft, controls the inlet and exhaust fluids flowing to and from the pistons, and wherein the partition also supports cam followers engageable by cam lobes at the ends of the pistons.

Another object of the invention is to provide a fluid motor having a novel combination of cam actuated pistons, inlet and exhaust valve means communicating therewith, passages communicating with said valve means, and a reversing valve disposed to supply motive fluid to said passages and readily adjustable for reversing the rotation of the motor shaft.

An additional object of the invention is to provide a fluid motor which is very compact in proportion to its output.

Further objects and advantages of the invention may be apparent from the following specification, appended claims and accompanying drawings, in which:

Figure 1 is a longitudinal sectional view of a fluid motor according to the present invention and showing internal parts of the motor in elevation;

Fig. 2 is a transverse sectional view taken from the line 2—2 of Fig. 1 showing one rotary valve of the present motor;

Fig. 3 is a transverse sectional view taken from the line 3—3 of Fig. 1 showing another rotary valve of the motor;

Fig. 6 is a transverse sectional view taken from the line 6—6 of Fig. 1 showing details of the reversing valve of the motor;

Fig. 11 is an end view of the motor showing a reversing valve actuator in connection therewith;

Fig. 12 is a sectional view taken from the line 12—12 of Fig. 11;

Fig. 13 is a graphic illustration of the angular phase relationships of cam lobes, at opposite ends of the motor pistons, relative to each other and to the respective cam followers; and Fig. 14 is an isometric exploded view of a piston, a valve and a cam member forming part of the motor.

Figure 8:
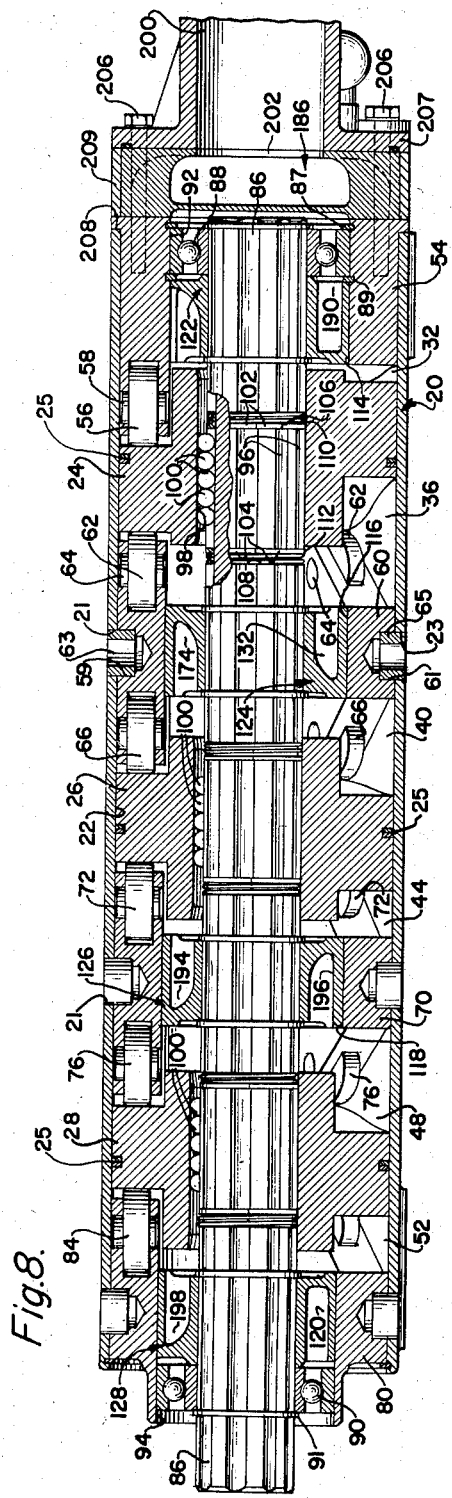
Fig. 8 is an axial sectional view taken from the line 8—8 of Fig. 1 showing the motor shaft and other parts in elevation to facilitate the illustration.
Figure 7:
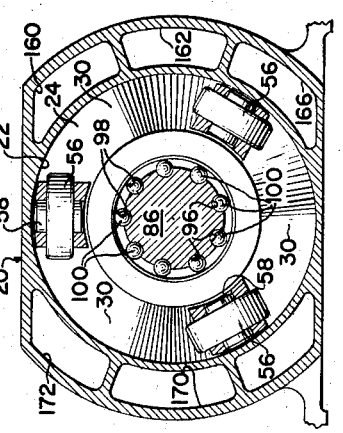
Fig. 7 is a transverse sectional view taken from the line 7—7 of Fig. 1.

As shown in Fig. 1 of the drawings, the pneumatic motor, according to the present invention, is provided with a hollow cylindrical housing 20, having a bore 22 therein. Reciprocally mounted in the bore 22 are pistons 24, 26 and 28. These pistons are each provided with axially undulated cam surfaces on their opposite ends and each piston may be provided with a suitable seal 25 about its periphery, as shown. Each cam surface of each piston is provided with three axially extending cam lobes equally spaced 120 degrees apart.

The piston 24 is provided with the three cam lobes 30 on one end adjacent to a motive fluid receiving chamber 32. The opposite end of the piston 24 is provided with the three cam lobes 34, which are equally spaced 120 degrees apart and 60 degrees out of phase relative to the lobes 30. Adjacent to the lobes 34 of the piston 24 is a motive fluid receiving chamber 36.

The piston 26 is provided with three cam lobes 38, which are spaced 120 degrees apart, and adjacent to lobes 38 is a motive fluid receiving chamber 40. The opposite end of the piston 26 is provided with three cam lobes 42, which are equally spaced 120 degrees apart and 60 degrees out of phase with the lobes 38. Adjacent to the lobes 42 is a motive fluid receiving chamber 44.

The piston 28 is provided with three cam lobes 46 on one end which are equally spaced 120 degrees apart and disposed adjacent a motive fluid receiving chamber 48. The opposite end of the piston 28 is provided with three cam lobes 50, which are equally spaced 120 degrees apart and 60 degrees out of phase relative to the lobes 46. Adjacent to the lobes 50 is a motive fluid receiving chamber 52.

Positioned in one end of the bore 22, adjacent to the piston 24, is a cam follower support 54, having three cam following rollers 56 which are equally spaced 120 degrees apart and mounted on bearing pins 58. These rollers 56 are engageable with the cam surfaces at one end of the piston 24. At the opposite end of the piston 24, positioned in the bore 22, is a cam follower support 60 which also forms a partition, in the cylinder bore 22, between the pistons 24 and 26. Cam follower rollers 62 are pivotally mounted on the support 60 by means of pins 64 and these rollers are equally spaced 120 degrees apart. The rollers 62 are engageable with the cam lobes 34 of the piston 24. Three cam follower rollers 66 are pivotally mounted on the opposite end of the cam follower support 60 by means of pins 68. These rollers 66 are equally spaced 120 degrees apart and are engageable with the lobes 38 of the piston 26.

A cam follower support 70 also serves as a partition, in the cylinder bore 22, between the pistons 26 and 28. Pivotally supported on the support 70 by means of pins 74 are three cam follower rollers 72. These rollers 72 are equally spaced 120 degrees apart and are engageable with the lobes 42 of the piston 26. Three cam follower rollers 76 are pivotally mounted on pins 78 carried by the cam follower support 70. These rollers 76 are equally spaced 120 degrees apart and engage the cam lobes 46 of the piston 28.

A cam follower support 80 is mounted in the opposite end of the bore 22 from the cam follower support 54, and carries pins 82, on which three cam follower rollers 84 are pivotally mounted. These cam follower rollers 84 are equally spaced apart 120 degrees and engage the cam lobes 50 of the piston 28.

It will be noted that all of the pins 58, 64, 68, 74, 78 and 82, as shown in Fig. 1 of the drawings, are aligned in a straight row which is parallel with the axis of the motor. Three rows of these pins, with the rows spaced 120 degrees apart, are provided to support the respective cam follower rollers, as shown in Fig. 1 of the drawing.

As shown in Fig. 8 of the drawing, the pistons 24, 26 and 28 are concentrically located on a shaft 86 which is mounted in bearings 88 and 90 supported in bores 92 and 94 of the cam follower supports 54 and 80 respectively.

As shown in Fig. 8, the cam follower support 60 is provided with recesses 59 and 61 in which hollow cylindrical pins 63 and 65 are positioned. These pins are projected through openings 21 and 23 in the side wall and bore 22 of the housing 20 and thereby maintain a fixed relation of the cam follower support 60 relative to the housing. The other cam follower supports 54, 70 and 80 are likewise fixed to the housing 20.

The outer race of the bearing 88 is axially retained in the cam follower support 54 by means of snap rings 87 and 89. The bearing 90 is axially retained on the shaft 86 by a snap ring 91.

The pistons may be connected to the shaft by any suitable spline or key means, however ball and groove spline mechanism is preferable for use in the present motor to alleviate friction when operating without lubrication and under high temperature conditions.

The shaft 86, as shown in Fig. 3 of the drawings, is provided with nine longitudinal grooves 96 therein. These grooves are semicircular in cross-section and are disposed 40 degrees apart about the periphery of the shaft. Each of the pistons 24, 26 and 28 is provided with corresponding semicircular grooves in which spline balls are retained. Referring to Fig. 8 of the drawings, it will be seen that piston 24 is provided with grooves 98, which correspond with the grooves 96 in the shaft 86, and that spline balls 100 interengage the grooves 96 and 98 in the shaft and piston. These balls permit the piston 24 to slide axially on the shaft but interconnect the piston and shaft in rotary driving relationship to each other. It will be understood that there are nine rows of spline balls 100 interconnecting the piston 24 and shaft 86, and that there are five balls in each row. For the purpose of retaining these balls longitudinally of the shaft 86, opposed spring-loaded retainers 102 and 104 are disposed in peripheral grooves 106 and 108 in the shaft. The retainers 102 and 104 consist of two semicircular sections retained respectively by coil springs 110 and 112 which are wrapped around reduced portions of the retainers 102 and 104, whereby the outside diameter of the springs 110 and 112 is slightly less than the land diameter of internal grooves in the piston 24 around the shaft 86. The space between the retainers 102 and 104 is made slightly greater than five times the diameter of one of the five spline balls shown, plus half the length of the piston stroke to permit the spline balls to roll freely between the retainers in both directions along the grooves 96 of the shaft 86 when the piston 24 reciprocates axially of the shaft.

The pistons 26 and 28 are connected to the shaft 86 by spline balls similar to those described in connection with the piston 24.

The cam follower supports 54, 60, 70 and 80 are provided with bores 114, 116, 118 and 120, in which rotary valves 122, 124, 126 and 128, respectively, are positioned. These rotary valves are fixed to the shaft 86. As shown in Fig. 3 of the drawings, the valve 124 is provided with a bore having inwardly directed semicircular projections 130, which engage the grooves 96 of the shaft 86. The other valves 122, 126 and 128 are connected to the shaft in a similar manner. The rotary valves 122, 124, 126 and 128 are arranged to conduct fluid into and out of the chambers 32, 36, 40, 44, 48 and 52, as will be hereinafter described in detail.

The rotary valve 124, as shown in Fig. 3 of the drawings, is provided with three circumferentially spaced passages 132 which communicate with the chamber 36. These passages 132 are equally spaced 120 degrees apart and are provided with radially directed openings 134, which alternately communicate with radially directed passages 136, 138, 140, 142, 144 and 146 in the cam follower support 60. The housing 20 is provided with openings 148, 150, 152, 154, 156 and 158, which extend into the bore 22 and communicate with the radially disposed passages 136, 138, 140, 142, 144 and 146, respectively. The housing 20 is provided with inlet and exhaust fluid conducting manifold passages which extend longitudinally thereof, outwardly of the bore 22, and which communicate with all of the valves 122, 124, 126 and 128. As shown in Fig. 3, these manifold passages 160, 162, 166, 168, 170 and 172 communicate with the openings 148, 150, 152, 154, 156 and 158, respectively.

Referring to Fig. 8 of the drawings, it will be seen that the passages 132 in the rotary valve 124 communicate with the chamber 36 and that the cam follower support 60, together with the valve 124, forms a partition between the chambers 36 and 40. The rotary valve 124 is provided with three circumferentially spaced passages 174, which are equally spaced 120 degrees apart and which communicate with the chamber 40. As shown in Fig. 3, the passages 174 are provided with radially directed openings 176, which are similar to the openings 134 of the passages 132. The openings 176 of the passages 174 are disposed to communicate alternately with the radially directed passages 136, 138, 140, 142, 144 and 146 of the cam follower support 60. It will be noted that the openings 134 and 176 of the passages 132 and 174 are closely adjacent to each other and are separated by radially extending partitions 178 disposed 120 degrees apart. Each of the openings 134 and 176 extends substantially 20 degrees about the perimeter of the valve member 124 at opposite sides of the partitions 178. Intermediate partitions 180, spaced 120 degrees apart, separate the passages 132 from the passages 174, and connected to the partitions 180 are arcuate wall portions 182, each extending substantially 80 degrees about the perimeter of the valve member 124. Partitions 135 are disposed between the radially extending passages 136, 138, 140, 142, 144 and 146 of the cam follower support 60, and portions 115 of the bore 116, at the inner ends of the partitions 135, each extend arcuately around the valve member 124 for approximately 20 degrees. Open spaces between the bore portions 115 each extend arcuately of the bore 116 for approximately 40 degrees.

The manifold passages 160, 162, 166, 168, 170 and 172 communicate with radially disposed passages in the cam follower supports 54, 60, 70 and 80, and these manifold passages may be used alternately as inlet and exhaust manifold passages, as will be hereinafter described in detail.

The construction of the valves 122, 126 and 128 is similar to that of the valve 124, hereinbefore described, except that valves 122 and 128 at the ends of motor have fluid conducting passages open on one end only, as will be hereinafter described in detail.

All of the valves and pistons rotate with the shaft 86, and therefore the valves operate in direct timing with respective pistons.

The three cam pistons 24, 26 and 28 are each movable axially of the shaft 86 three times toward each end of the shaft during each revolution thereof. Since each piston has three lobes on each of its ends, it is capable of delivering six power strokes for each revolution of the shaft 86. In order to accomplish this arrangement, the pistons which are substantially identical are arranged out of phase with each other substantially 40 degrees, permitted by the fact that the grooves 96 in the shaft 86 are disposed 40 degrees apart.

Figure 9:
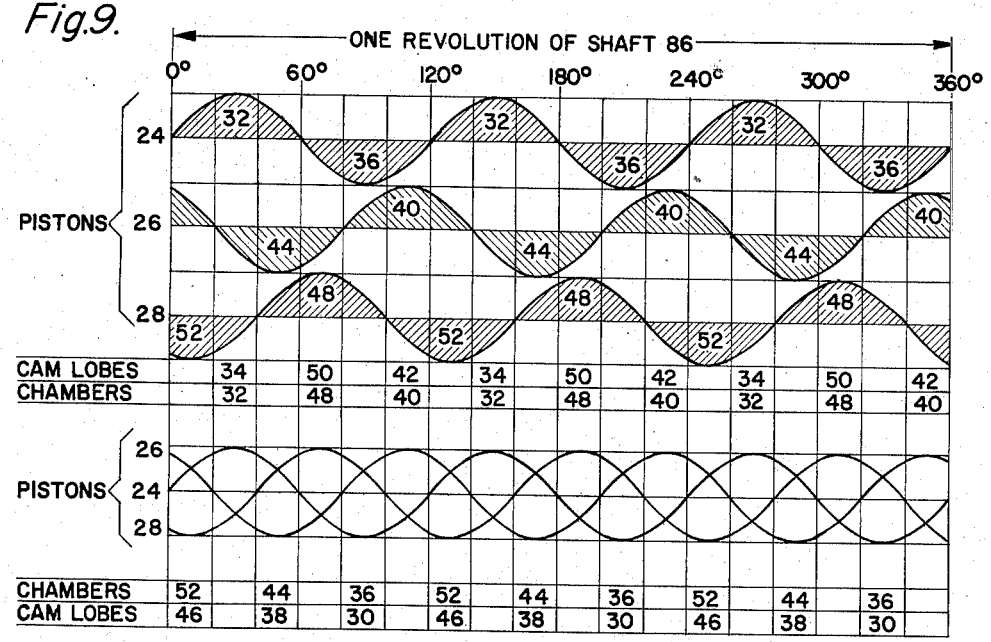
Fig. 9 is a graphic illustration of the power stroke order and cycle relationship of the double-acting pistons and fluid receiving chambers of the motor.
Figure 10:
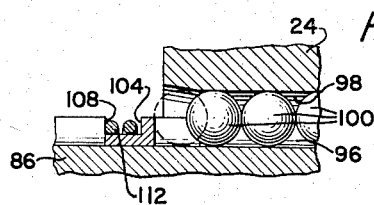
Fig. 10 is an enlarged partial sectional view of the ball spline retaining means carried by the shaft of the present motor to limit axial movement of the spline balls along the motor shaft during reciprocation of the motor pistons thereon.

Referring to Fig. 13 of the drawings, it will be seen that when the shaft 86 is in the position shown in Fig. 1 and indicated in Fig. 9, the piston 24 has its cam lobes 34 aligned with the cam follower rollers, while the lobes 30 of the piston 24 are 60 degrees out of phase relative to the lobes 34. The cam lobes 42 of the piston 26 are 40 degrees out of phase relative to the cam lobes 34 of the piston 24, and the lobes 38 of the piston 26 are phased 60 degrees from the lobes 42. The cam lobes 50 of the piston 28 are 40 degrees out of phase relative to the cam lobes 42 of the piston 26. The cam lobes 46 of the piston 28 are disposed 60 degrees from the cam lobes 50 thereof. The pistons 24, 26 and 28 contain an aggregate of 18 cam lobes, and when arranged as shown in Fig. 13 of the drawings, these lobes are all spaced 20 degrees apart. They are disposed to deliver one power stroke every 20 degrees of shaft rotation. Since each power stroke of each piston is accompanied by 60 degrees of shaft rotation, the three pistons, being arranged to deliver 18 power strokes during each shaft revolution, prevent the existence of a power delivery null position of the motor.

As shown in Fig. 3 of the drawings, the manifold passages 160, 166 and 170 function as inlet passages for the admission of motive fluid inwardly to the rotary valves through the passages in the cam follower supports. The manifold passages 162, 168 and 172 function as exhaust passages for fluid leaving the rotary valves.

As shown in Fig. 2 of the drawings, the valve 122 is provided with three passages 187 having openings 188, which are disposed 120 degrees apart. These passages are similar to the passages 174 of the rotary valve 124. Since the valve 122 handles only the inlet and exhaust fluids relative to the chamber 32, it is only a single-sided valve and therefore has only the three fluid conducting passages 188. Cavities 190 are disposed between the passages 188, but these cavities 190 merely displace solid material and therefore reduce the weight of the valve.

Construction of the valve 128 is similar to that of the valve 122, while both valves 124 and 126 are double-sided valves, each having six fluid conducting passages. This structural arrangement has been hereinbefore described relative to Fig. 3 of the drawings.

As shown in Fig. 2, it will be seen that the openings 188 of the valve 122, when in the position shown, are closed by partitions 192 between openings in the cam follower support 54. This position of the valve 122 coincides with the positions of the cam lobes 34 in alignment with the cam follower rollers 62. Rotation of the shaft 86 in the direction of the arrow A will move the passage openings 188 into communication with manifold passages 160, 166 and 170 as the cam lobes 34 pass over the centers of the rollers 62, thereby admitting motive fluid to the chamber 32 and permitting fluid to force the piston 24 toward the cam follower rollers 62.

Attention is directed to Fig. 3 wherein the position of the shaft 86 corresponds with that as shown in Fig. 2. With such a corresponding position of the shaft 86, the valve 124 has its passages 174 in communication with the chamber 40 and the inlet manifold passages 160, 166 and 170. It will be noted that the openings 176 of the passages 174 are shown within about 20 degrees of closing corresponding to the fact that the lobes 42 of the piston 26 are shown 40 degrees past the centers of the cam follower rollers 72. As shown in Fig. 3 of the drawings, the passages 132 of the rotary valve 124 are aligned with the closed bore portions 115 in the cam follower support 60, corresponding to positions of the cam lobes 34 of the piston 24 in alignment with the cam follower roller 62. As the rotary valve 124 rotates in the direction of the arrow A, the openings 134 of the passages 132 communicate with the exhaust manifold passages 162, 168 and 172, thereby permitting escape of fluid from the chamber 36 as the piston 24 rotates and advances toward the cam follower rollers 62.

Figure 4:
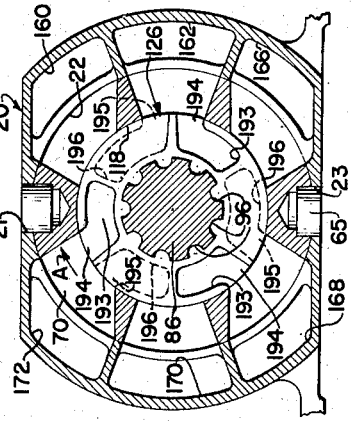
Fig. 4 is a transverse sectional view taken from the line 4—4 of Fig. 1 showing another rotary valve of the motor.

The valve 126, as shown in Fig. 4 of the drawings, has passages 193 provided with openings 194 which communicate with the chamber 44 and the exhaust manifold passages 162, 168 and 172. These passage openings 194 as shown are within about 20 degrees of a closing position due to the fact that the cam lobes 42 of the piston 26 have traversed approximately two-thirds of their stroke relative to the cam follower rollers 72. Passages 196, have openings 195 in the rotary valve 126 in communication with the exhaust manifold passages 162, 168, and 172, but follow behind the passage openings 194 substantially 20 degrees, since the lobes 46 of the piston 28 follow 20 degrees behind the lobes 42 of the piston 26 relative to the cam follower rollers 76 and 72 respectively. Thus, the valve 126 concurrently acts as an exhaust valve for fluid being displaced from the chambers 44 and 48 by the pistons 26 and 28, respectively.

Figure 5:
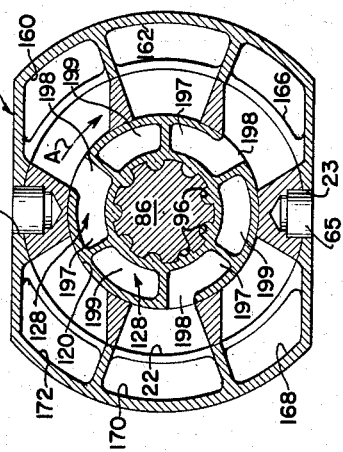
Fig. 5 is a transverse sectional view taken from the line 5—5 of Fig. 1 showing another rotary valve of the motor.

The rotary valve 128, as shown in Fig. 5 of the drawings, has passages 197 having openings 198 communicating with manifold inlet passages 160, 166 and 170, which in turn communicate with the chamber 52. It will be seen that these passage openings 198, in the positions shown, have traversed 20 degrees of the passages 160, 166 and 170 corresponding to a position of the cam lobes 46 of the piston 28 relative to the cam follower rollers 76. Disposed between the passage openings 198 are openings 199 similar to the openings 190 in the valve 122. The openings 199 do not function as valve passages since they do not have openings communicating with the radially directed passages in the cam follower support 54.

From the foregoing, it will be seen that the openings 176 in the valve 124 are 40 degrees out of phase relative to the openings 188 in the valve 122, while the openings 195 in the valve 126 are 40 degrees out of phase with the openings 176 in the valve 124. Likewise, the openings 194 in the valve 126 are 40 degrees out of phase relative to the openings 198 in the valve 128 and the openings 134 of the valve 124 are 40 degrees out of phase relative to the openings 194 in the valve 126. The relative positions of these valve passages correspond directly with a respective phase relationship between cam lobes of the pistons 24, 26 and 28.

As shown in Fig. 6, a reversing valve 186 is arranged to control the inlet of fluid into the manifold passages and thereby control the direction of rotation of the shaft 86. This reversing valve 186 is arranged alternately to admit motive fluid into either the inlet manifold passages or the exhaust manifold passages, whereby the intakes may be converted to exhausts, or vice versa.

As shown in Fig. 1 of the drawings, the motor is provided with a central inlet conduit 200 which registers with a central opening 202 in one end of the reversing valve 186. This central opening 202 communicates with three radially directed segmental passage portions 204, which are shown as communicating with the inlet manifold passages 160, 166 and 170. Between the segmental passage portions 204, the reversing valve is provided with open spaces which communicate with manifold exhaust passages 162, 168 and 172. As shown by an arrow B in Fig. 1 of the drawings, fluid may be exhausted from the passage 172 through the open spaces between two of the segmental passage portions 204 to atmosphere.

The reversing valve 186 is rotatably secured to the end of the housing 20 by means of bolts 206 which hold a flange 207 formed on the conduit 200 against the inlet side of the reversing valve. The flange 207 is axially spaced from the end 208 of the housing 20 by means of a spacer 209 to permit rotation of the reversing valve 186. Thus, the reversing valve 186 is secured between the flange 207 and the end 208 of the housing 20. The reversing valve 186 is thus held axially of the motor but is arranged to be rotated substantially 60 degrees in order to permit the conduit 200 to communicate with either the inlet passages 160, 166 and 170, or the exhaust passages 162, 168 and 172.

As shown in Fig. 11 of the drawings, an actuator 210 is mounted on the housing 20 by means of a bracket 212 and bolts 206. This actuator is provided with a plunger 214 having a slot 216 at one end in which a pin 218 is engaged. This pin 218, as shown in Fig. 12 of the drawings, is connected to the reversing valve 186, whereby axial movement of the plunger 214 causes rotation of the reversing valve 186 from one position to another relative to the housing 20, in order to reverse operation of the motor, as hereinbefore described. The actuator 210 is provided with a cylinder bore 222 having a piston 224 reciprocally mounted therein and connected to the plunger 214. Inlet conduits 226 and 228 communicate with opposite ends of the cylinder bore 222 and with opposite ends of the piston 224 in order to provide for admission of fluid to and exhaust from each end of the piston, for motivating it in either axial direction as desired. The control of motive fluid to the actuator 210 may be remotely from the motor of the present invention as desired.

Operation of the motor in accordance with the present invention is substantially as follows:

When motive fluid is admitted through the valve 186 in the position shown in Fig. 6 of the drawings, fluid passes through the radially directed segmental passages 204 into the inlet passages 160, 166 and 170. These passages communicate with radially directed passages 136, 140 and 144 in the cam follower support 60. The inlet manifold passages also communicate with similar radial passages in the cam follower supports 54, 70 and 80. Other radial passages in all of the cam follower supports also communicate with the exhaust manifold passages 162, 168 and 172. It will be apparent, from Figs. 3 and 5, that openings 176 in valve 124 and openings 198 in valve 128 are open to passages 160, 166 and 170 which are at this time supplied with fluid under pressure. Such fluid will flow through passages 174 in valve 124 and passages 197 in valve 128, respectively, to chambers 40 and 52. The force of this fluid under pressure will cause pistons 26 and 28 to move axially, piston 26 moving toward the left and piston 28 toward the right, both as viewed in Fig. 1. To permit axial movements of these pistons, the openings 194 and 195 in valve 126, toward which the pistons 26 and 28 are moving, are in communication with exhaust manifold passages 162, 168, and 172 so that fluid in chambers 44 and 48 can escape. Movements of pistons 26 and 28 in this manner will cause the cam surfaces thereon to react with followers 72 and 76 and impart rotary movement to the pistons and shaft. After a predetermined degree of rotary movement, openings 176 of valve 124 and openings 194 of valve 126 will be closed by portions 115 of the bore wall. Openings 198 in valve 128 and openings 195 in valve 126 will still be in communication with the inlet and outlet passages, respectively, so the application of torque to the shaft will be continued. It will be obvious that after a certain degree of rotary movement of the shaft, openings 194 in valve 126 will communicate with inlet manifold passages 160, 166, and 168, and openings 176 in valve 124 will communicate with exhaust manifold passages 162, 168, and 172. At this time fluid under pressure will be admitted to chamber 44 and piston 26 will start to move toward the right as viewed in Fig. 1. During this movement of piston 26 the cam surfaces 38 thereon will react on rollers 66 to transmit torque to the piston and shaft. Each of pistons 24, 26, and 28 are reciprocated in this manner. Since each piston is provided with three cam lobes on each end, it is capable of transmitting six power strokes toward each revolution of the shaft 86. During each revolution of the shaft 86, the aggregate of power strokes, accomplished by the three pistons, is 18. The angular phasing of the piston cam lobes, together with the passages in the rotary valves 122, 124, 126 and 128, as hereinbefore described, permits one power stroke to be delivered each 20 degrees of shaft rotation, whereby the 18 power strokes are evenly distributed throughout 360 degrees of shaft rotation.

With reference to Figs. 1 to 9 of the drawings, it will be seen that each revolution of the shaft 86 is accompanied by 18 power strokes, each having a duration of approximately 60 degrees, and that motive fluid is consecutively conducted into chambers 32, 44, 48, 36, 40 and 52, which causes respective cam lobes 34, 38, 50, 30, 42 and 46 to bear against respective cam follower rollers. It will be noted that the conduction of motive fluid to the chambers is timed by the respective rotary valves, in accordance with the respective angular positions of the cam lobes on the pistons, relative to the cam follower rollers, as hereinbefore described. With reference to Fig. 9 of the drawings, it will be seen that the combined torque, delivered to the shaft by the pistons, is relative smooth. Also accelerative forces imposed axially of the shaft, by cam actuation of the pistons, are substantially balanced.

It will be apparent to those skilled in the art that various modifications may be made in the invention without departing from its spirit and scope.

We claim:
1. In a fluid operated motor the combination of: a housing having a bore therein; a shaft rotatably mounted in said housing concentric with said bore; piston means in said bore and concentrically mounted on said shaft; spline means interconnecting said piston means and said shaft, said spline means permitting said piston means to slide axially of said shaft and said bore and coupling said piston means to said shaft in rotary driving relation therewith; passage means for conducting motive fluid to and from opposite ends of said piston means; a rotary valve member carried by said shaft and communicating with opposite ends of said piston means and disposed to conduct fluid between said passage means and said pis- ton means; cam and cam follower means concentric with said shaft and operable at the opposite ends of said piston means for causing said piston means to rotate about and reciprocate along the axis of said shaft when motive fluid is conducted to and from opposite ends of said piston means.

2. In a fluid operated motor, the combination of: a housing having a bore therein; a shaft rotatably mounted in said housing concentric with said bore; a plurality of pistons disposed in said bore and concentrically mounted on said shaft; each of said pistons having a plurality of axially undulated cam surfaces on a radial end face thereof; partitions fixed in said bore between said pistons; cam follower means supported on said partitions and disposed to be engaged by the cam surfaces of said pistons; spline means interconnecting said pistons and said shaft, said spline means permitting said pistons to slide axially of said shaft and coupling said pistons thereto in rotary driving relation therewith; passage means having a plurality of inlet and exhaust conduits disposed outwardly of said bore in said housing for conducting motive fluid to and from opposite ends of said pistons; a plurality of rotary valve members carried by said shaft, each of said partitions having a bore in which one of said rotary valve members is disposed; each of said partitions in addition having openings extending radially from each valve member and communicating with said passage means, and each of said rotary valve members being disposed to control the flow of motive fluid into and out of said housing adjacent said pistons.

3. In a fluid operated motor, the combination of: a housing having a bore therein, end walls mounted in said housing at opposite ends of said bore; a shaft rotatably mounted in said housing concentric with said bore; a plurality of pistons disposed in said bore and mounted on said shaft, each of said pistons having a plurality of axially undulated cam surfaces formed on a radial face thereof; partitions fixed in said bore between said pistons; cam follower means supported on said partitions and disposed to be engaged by the cam surfaces of said pistons; additional cam follower means supported on said end walls and disposed to be engaged by the cam surfaces of the pistons adjacent said end walls; spline means for interconnecting said pistons and said shaft; passage means having a plurality of inlet and exhaust conduits disposed outwardly of said bore for conducting motive fluid to and from opposite ends of said pistons; a plurality of rotary valve members carried by said shaft, each of said partitions having a bore in which a rotary valve member is disposed, each of said end walls having a bore in which a rotary valve member is disposed, and each of said partitions and each end wall having openings extending radially from a respective valve member and communicating with said passage means.

4. A fluid operated motor comprising: a housing forming a cylindrical chamber closed at both ends; a shaft rotatably supported in said housing concentric with the axis of said cylindrical chamber; partiton means fastened to said housing and dividing said cylindrical chamber into separate piston chambers; a piston mounted in each of said piston chambers and disposed for movement along the axis of said shaft; spline means connecting each of said pistons to said shaft for rotation therewith; a plurality of rotary valves secured to said shaft for controlling the inlet and exhaust of motive fluid from both ends of said piston chambers; one of said rotary valves being disposed in a bore formed in said partition means and a rotary valve being disposed in a bore formed in each end wall of said cylindrical chamber; at least one inlet and exhaust passageway disposed outwardly of said cylindrical chamber; said partition means and each of said ends having passageways for connecting said inlet and exhaust passageways with said rotary valves; and cam means for converting the axial movement of said pistons into rotation of said shaft.

5. A fluid operated motor comprising: a housing forming a cylindrical chamber closed at both ends; a shaft rotatably supported in said housing concentric with the axis of said cylindrical chamber; partition means fastened to said housing and dividing said cylindrical chamber into separate piston chambers; a piston mounted in each of said piston chamber and disposed for movement along the axis of said shaft; spline means connecting each of said pistons to said shaft for rotation therewith; a plurality of rotary valves secured to said shaft for controlling the inlet and exhaust of motive fluid from both ends of said piston chambers; said partition means having a bore in which a rotary valve is disposed, each end of said cylindrical chamber having a bore in which a rotary valve is disposed; at least one inlet and exhaust passageway disposed outwardly of said cylindrical chamber; said partition means and each of said ends having passageways for connecting said inlet and exhaust passageways with said rotary valves; and cam means for converting axial movement of said pistons into rotation of said shaft, said cam means consisting of an undulating cam surface formed on a radial surface adjacent each end of each of said pistons; and cam follower means mounted on said partition means and said ends of said cylindrical chamber and disposed to engage said cam surfaces.

6. A fluid operated motor comprising: a housing forming a cylindrical chamber closed at both ends; a shaft rotatably supported in said housing concentric with the axis of said cylindrical chamber; partition means fastened to said housing and dividing said cylindrical chamber into separate piston chambers; a piston mounted in each of said piston chambers and disposed for movement along the axis of said shaft; spline means connecting each of said pistons to said shaft for rotation therewith; a plurality of rotary valves secured to said shaft for controlling the inlet and exhaust of motive fluid from both ends of said piston chambers; said partition means having a bore in which a rotary valve is disposed, each end of said cylindrical chamber having a bore in which a rotary valve is disposed; at least one inlet and exhaust passageway disposed outwardly of said cylindrical chamber; said partition means and each of said ends having passageways for connecting said inlet and exhaust passageways with said rotary valves; cam means for converting the axial movement of said pistons into rotation of said shaft; and a reversible valve means for selectively connecting a source of motive fluid to said inlet or exhaust passageway to control the direction of rotation of said motor.

7. A fluid operated motor comprising: a tubular member having a cylindrical bore; closure means for closing the ends of said tubular member; a shaft rotatably supported in said tubular member by said closure means, an output end of said shaft projecting through one of said closure means; at least one radial partition mounted in said bore and fixed to said tubular member, said radial partition and said closure means dividing said tubular member into a plurality of individual piston chambers; a piston disposed in each of said piston chambers; spline means for connecting said pistons to said shaft; oppositely directed generally radial undulated cam surfaces formed on each of said pistons; a plurality of fixed cam rollers mounted on said partition and said closure means, said cam rollers being disposed to engage said cam surfaces; a bore formed in said partition concentric with the axis of said shaft; a first rotary valve disposed in said bore and connected to said shaft, said first rotary valve having a plurality of ports formed therein, each of said ports communicating with one radial surface and the cylindrical surface of said rotary valve, adjacent ports communicating with opposite radial surfaces thereof; a bore formed in each of said closure means concentric with said shaft; a secondary rotary valve disposed in the bore of said closure means; a third rotary valve disposed in the bore of the other of said closure means; said second and third rotary valves having a plurality of ports communicating with one radial surface and the cylindrical surface of said second and third rotary valves; a plurality of longitudinal passageways formed in said tubular member and spaced radially outward from said bore, each of said longitudinal passageways being closed at one end and open at the other end; a plurality of radial passageways formed in said partition and in each of said closure means and extending from the bores of said partition and closure means to the outer surface of said partition and closure means; and additional radial passageways formed in said tubular member, said additional radial passageways connecting each of said longitudinal passageways with one of said plurality of radial passageways.

8. A fluid operated motor comprising: a tubular member having a cylindrical bore; closure means for closing the ends of said tubular member; a shaft rotatably supported in said tubular member by said closure means, an output end of said shaft projecting through one of said closure means; at least one radial partition mounted in said bore and fixed to said tubular member, said radial partition and said closure means dividing said tubular member into a plurality of individual piston chambers; a piston disposed in each of said piston chambers; spline means for connecting said pistons to said shaft; oppositely directed generally radial undulated cam surfaces formed on each of said pistons; a plurality of fixed cam rollers mounted on said partition and said closure means, said cam rollers being disposed to engage said cam surfaces; a bore formed in said partition concentric with the axis of said shaft; a first rotary valve disposed in said bore and connected to said shaft, said first rotary valve having a plurality of ports formed therein, each of said ports communicating with one radial surface and the cylindrical surface of said rotary valve, adjacent ports communicating with opposite radial surfaces thereof; a bore formed in each of said closure means concentric with said shaft; a second rotary valve disposed in the bore of said one closure means; a third rotary valve disposed in the bore of the other of said closure means; said second and third rotary valves having a plurality of ports communicating with one radial surface and the cylindrical surface of said second and third rotary valves; a plurality of longitudinal passageways formed in said tubular member and spaced radially outward from said bore, each of said longitudinal passageways being closed at one end and open at the other end; a plurality of radial passageways formed in said partition and in each of said closure means and extending from the bores of said partition and closure means to the outer surface of said partition and closure means; additional radial passageways formed in said tubular member, said additional radial passageways connecting each of said longitudinal passageways with one of said plurality of radial passageways; and reversible valve means for selectively connecting a source of motive fluid to the open end of a predetermined number of said longitudinal passageways while permitting the open ends of the remaining longitudinal passageways to exhaust to the atmosphere surrounding said fluid operated motor.

9. A fluid pressure device comprising: cylinder means having a bore; a shaft supported by said cylinder means for rotation in said bore; piston means disposed in said bore and connected for rotation with said shaft and longitudinal movement relative thereto; reaction means on said cylinder and piston means for converting the axial movement of the piston means into a plurality of rotary impulses of predetermined duration and transmitting the same to said shaft, said reaction means having certain elements disposed at locations spaced angularly around the axis of said shaft to start each rotary impulse of an operating cycle at a different point of rotation of said shaft and cause coexistence of portions of certain impulses; and rotary valve means connected for rotation with said shaft to control the inflow to and exhaust of motive fluid from said cylinder and effect longitudinal movement of said piston means, said valve means having portions spaced angularly about the axis of said shaft to so time the inflow of motive fluid that a torque force will be continuously applied to said shaft.

10. A fluid pressure device comprising: a housing forming an elongated chamber and inlet and exhaust passages extending longitudinally thereof at at least one side of the housing, said passages communicating with said chamber through ports spaced longitudinally and circumferentially thereof; shaft means journalled in said housing for relative rotary movement therebetween; partition forming means supported in said chamber in registration with said ports, said partition means dividing the chamber into sections; a piston element disposed in each chamber section for reciprocation, said piston elements being connected for rotary movement with said shaft means and longitudinal movement relative thereto; reaction cam and follower means on said piston elements and housing to cause relative rotary movement therebetween upon reciprocation of the piston elements in the housing; and valve means connected with said shaft at said partition forming means, said valve means being operative upon relative rotary movement between said housing and shaft to open and close the ports communicating with said inlet and outlet passages and control the inflow to and exhaust of operating fluid from said chamber sections, said valve means being circumferentially located around the shaft relative to the cam and follower means in a manner to cause the continuous application of torque forces to the movable element of the motor.

11. A fluid pressure device comprising: a housing forming an elongated chamber and inlet and exhaust passages extending longitudinally thereof at at least one side of said housing, said passages communicating with said chamber through longitudinally spaced sets of circumferentially spaced ports; shaft means journalled in said housing for relative rotary movement therebetween; partition forming means supported in said chamber in registration with said ports, said partition means dividing the chamber into sections; a piston element disposed in each chamber section for reciprocation, said piston elements being connected for rotary movement with said shaft means and longitudinal movement relative thereto; reaction cam and follower means on said piston elements and housing to cause relative rotary movement therebetween upon reciprocation of the piston elements in the housing; and valve means connected with said shaft in registration with said sets of ports, said valve means being operative upon relative rotary movement between said shaft and housing to control fluid flow to and from said chamber sections and reciprocation of said piston elements, the shape of said cam and follower means and the location of said valve means relative thereto serving to cause a plurality of reciprocations of each piston for each cycle of relative rotation between said shaft and housing, said piston reciprocations being initiated at intervals spaced equally throughout such cycle.

12. A fluid pressure device comprising: a housing forming an elongated chamber and inlet and exhaust passages extending longitudinally thereof at at least one side of said housing, said passages communicating with said chamber through longitudinally spaced sets of circumferentially spaced ports; shaft means journalled in said housing for relative rotary movement therebetween; partition forming means supported in said chamber in registration with said ports, said partition means dividing the chamber into sections; a plurality of piston elements disposed for reciprocation in said chamber, each section of said chamber containing one piston element, said piston elements being connected for rotation with said shaft means, such connection providing for relative longitudinal movement between said piston elements and said shaft means; reaction means on said piston elements and housing to cause relative rotary movement therebetween upon reciprocatory movement of said piston elements, said reaction means causing a plurality of reciprocations of each piston element for each cycle of relative rotary movement between it and said housing; and valve means actuated by relative rotary movement between said housing and shaft means to control fluid flow to and from said chamber sections, said valve means being disposed relative to said reaction means to initiate fluid flow into predetermined chamber sections at intervals spaced equally throughout a cycle of relative rotary movement between said shaft and housing.

13. A fluid pressure device comprising: a housing forming an elongated chamber and inlet and exhaust passages extending longitudinally thereof at at least one side of said housing, said passages communicating with said chamber through longitudinally spaced sets of circumferentially spaced ports; shaft means journalled in said housing for relative rotary movement therebetween; partition forming means supported in said chamber in registration with said ports, said partition means dividing the chamber into sections; three double-acting piston elements disposed for reciprocation in said chamber, each section of said chamber containing one piston element, said piston elements being connected for rotation with said shaft means, such connection providing for relative longitudinal movement between said piston elements and said shaft means; reaction means on said piston elements and housing to cause relative rotary movement therebetween upon reciprocatory movement of said piston elements, said reaction means causing three reciprocations of each piston element for each cycle of relative rotary movement between it and said housing; and valve means actuated by relative rotary movement between said housing and shaft means to control fluid flow to and from said chamber sections, said valve means being disposed relative to said reaction means to initiate fluid flow to each end of each chamber section three times during each cycle of relative rotary movement between said shaft and housing, the initiations of fluid flow being timed at intervals spaced equally throughout such cycle.

14. A fluid pressure device comprising: housing means forming an elongated chamber; shaft means journaled in said housing means, one of said means forming inlet and exhaust passages communicating with said chamber through ports spaced longitudinally and angularly about the axis thereof; a plurality of piston elements disposed in said chamber for reciprocation, said piston elements being connected for rotary movement with said shaft means and longitudinal movement relative thereto; valve means connected with one of said housing and shaft means for rotary movement therewith relative to the other, a valve means being disposed at each end of each piston element, said valve means and said inlet and outlet ports being angularly spaced about the axis of said shaft and of a quantity sufficient to cause each piston element to reciprocate a plurality of times for each rotation of said shaft means relative to said housing means; and reaction means on said housing means and piston elements to convert each longitudinal motion of the latter into a rotary impulse of said shaft means relative to said housing means, said reaction means having elements spaced angularly about the axis of said shaft means and disposed relative to the valve means to cause torque force to be applied continuously throughout each cycle of relative rotary movement between said shaft and housing means.

15. A fluid pressure device comprising: housing means forming an elongated chamber; shaft means journaled in said housing means, one of said means forming inlet and exhaust passages communicating with said chamber through ports spaced longitudinally and angularly about the axis thereof; a plurality of piston elements disposed in said chamber for reciprocation, said piston elements being connected for rotary movement with said shaft means and longitudinal movement relative thereto; valve means connected with one of said housing and shaft means for rotary movement therewith relative to the other, a valve means being disposed at each end of each piston element, said valve means and said inlet and outlet ports being angularly spaced about the axis of said shaft and of a quantity sufficient to cause each piston element to make a plurality of reciprocations during each relative rotation between said shaft and housing means, the initiation of the reciprocations of different piston elements being out of phase less than 180 degrees of relative rotation between said shaft and housing means; and cam and follower means on said housing and piston elements to translate each longitudinal movement of the latter into a torque impulse of said shaft means relative to said housing means, said cam and follower means being disposed relative to said valve means to cause the torque impulses translated by certain piston elements to coexist in part and be initiated simultaneously with the respective piston reciprocations so that torque force will be applied continuously.

16. A fluid pressure device comprising: housing means forming an elongated chamber; shaft means journaled in said housing means, one of said means forming inlet and exhaust passages communicating with said chamber through ports spaced longitudinally and angularly about the axis thereof; at least three piston elements disposed in said chamber for reciprocation, said piston elements being connected for rotary movement with said shaft means and longitudinal movement relative thereto; valve means connected with one of said housing and shaft means for rotary movement therewith relative to the other, a valve means being disposed at each end of each piston element, said valve means and said inlet and outlet ports being angularly spaced about the axis of said shaft and of a quantity sufficient to cause each piston element to make three complete reciprocations during each rotation of said shaft means relative to said housing means; and cam and follower means on said housing and piston elements to translate each longitudinal movement of the latter into a torque impulse of said shaft means relative to said housing means, said cam and follower means being spaced angularly about the axis of the shaft means and disposed relative to said valve means to cause the torque impulses transmitted by different piston elements to coexist in part and be initiated at different points in the cycle of relative rotary movement between said shaft and housing means so that torque force will be applied continuously.

17. A fluid pressure operated motor comprising: housing means forming an elongated chamber; shaft means journaled in said housing means, one of said means forming inlet and exhaust passages communicating with said chamber through ports spaced longitudinally and axially thereof; a plurality of piston elements disposed in said chamber for reciprocation, said piston elements being connected for rotary movement with and axial movement relative to one of said housing and shaft means; a valve means disposed at each end of each piston and connected with one of said housing and shaft means for rotary movement relative to said inlet and exhaust ports, said valve means being operative to alternately apply fluid under pressure to opposite ends of each piston, the valve means at the end of each piston having portions angularly disposed about the axis of said shaft to initiate a piston movement at a plurality of predetermined stages of relative rotation of said shaft and housing means; and reaction means between said housing and piston means for translating the reciprocatory movement of said piston means into relative rotary movement of said shaft and housing means.

References Cited in the file of this patent

UNITED STATES PATENTS

| | | |
|---|---|---|
| 1,389,453 | Moore | Aug. 30, 1921 |
| 1,629,686 | Dreisbach | May 24, 1927 |
| 1,833,501 | Schick | Nov. 24, 1931 |
| 2,316,107 | Ruben | Apr. 6, 1943 |
| 2,765,778 | Gerry et al. | Oct. 9, 1956 |